(12) United States Patent
Yoon

(10) Patent No.: US 9,528,640 B2
(45) Date of Patent: Dec. 27, 2016

(54) TIGHTNESS-INDICATING TUBE FITTING

(75) Inventor: Jong-Chan Yoon, Busan (KR)

(73) Assignee: BMT Co., Ltd., Yangsan-si (KR)

( * ) Notice: Subject to any disclaimer, the term of this patent is extended or adjusted under 35 U.S.C. 154(b) by 966 days.

(21) Appl. No.: 13/577,597

(22) PCT Filed: Feb. 23, 2010

(86) PCT No.: PCT/KR2010/001102
§ 371 (c)(1),
(2), (4) Date: Aug. 7, 2012

(87) PCT Pub. No.: WO2011/099667
PCT Pub. Date: Aug. 18, 2011

(65) Prior Publication Data
US 2012/0313367 A1    Dec. 13, 2012

(30) Foreign Application Priority Data
Feb. 11, 2010  (KR) .................. 10-2010-0012762

(51) Int. Cl.
*F16L 19/10*    (2006.01)

(52) U.S. Cl.
CPC .......... *F16L 19/103* (2013.01); *F16L 2201/10* (2013.01)

(58) Field of Classification Search
CPC ..... F16L 19/103; F16L 19/083; F16L 2201/10
USPC ...................................... 285/93, 3
See application file for complete search history.

(56) References Cited

U.S. PATENT DOCUMENTS

| 4,475,748 A * | 10/1984 | Ekman .............. F16L 19/0206 285/12 |
| 5,074,599 A | 12/1991 | Wirbel et al. |
| 7,871,109 B1 * | 1/2011 | McKinnon et al. ........... 285/12 |
| 2001/0047593 A1 | 12/2001 | Williams et al. |

FOREIGN PATENT DOCUMENTS

| JP | 9-137884 A | 5/1997 |
| JP | 10-267177 A | 9/1998 |
| JP | 2006-329214 A | 12/2006 |
| KR | 10-2002-0039671 A | 5/2002 |
| KR | 10-0666109 B1 | 1/2007 |
| WO | WO 2009054534 A1 * | 4/2009 |

* cited by examiner

*Primary Examiner* — David E Sosnowski
*Assistant Examiner* — James Linford
(74) *Attorney, Agent, or Firm* — Birch, Stewart, Kolasch & Birch, LLP

(57) ABSTRACT

A tightness-indicating tube fitting is disclosed. The tightness-indicating tube fitting includes a tube inserted into a body, at least one ferrule disposed around the tube, a nut fastened onto the body to deform the ferrule for providing a seal between the body and the tube, and a check ring having a pressure-receiving section protruding from a side of the check ring facing the nut. The pressure-receiving section has an inner diameter part which is provided with a slope. When the nut is fastened onto the body by the amount of nut rotation corresponding to a predetermined length as the nut moves forwards after having made an initial contact with the slope of the pressure-receiving section, a pressing force of the nut acts on the slope and the check ring is detached from the body by a pressing force of the nut such that a fastened state of the nut is checked.

17 Claims, 11 Drawing Sheets

TIGHTNESS-INDICATING TUBE FITTING

TECHNICAL FIELD

The present invention relates, in general, to a tube fitting and, more particularly, to a tightness-indicating tube fitting for which conducting a visual inspection as to whether the amount of nut torque has reached a reference value is designed to be easy.

BACKGROUND ART

Generally, the strongest amount of interest is paid to a portion where fluid flows may possibly leak, causing industrial facilities that deal with dangerous articles, particularly, to suffer a grave accident, so that strict management and construction procedures are needed regarding such a portion or the facilities.

A structure of a representative tube fitting uses a ferrule, and is schematically shown in FIGS. 1 and 2.

As shown in the figure, the tube fitting includes a body 100, a tube 200 which is inserted into the body, a ferrule 300, and a nut 400. Here, the tube fitting can be sealed only by fastening the nut to the extent that the amount of nut rotation reaches a reference value. That is, when the nut 400 is fastened by the amount of nut rotation corresponding to a reference value, the ferrule 300 is moved forward to grip the outer surface of the tube and to be deformed, thereby sealing the tube fitting.

However, when an operator fastens the nut using hand tool, he/she cannot make sure whether the nut has been fastened with precision, and once the fastening has been done, it is impossible for a person other than the operator to check whether the nut has been properly fastened or not.

To solve this problem, at the place of assembly of the tube fitting a proposal has been made to use a special jig, which is designed not to be inserted into a gap between the body and the nut when the nut is not properly fastened, in order to check the fastened state of the nut. That is, if the nut is not properly fastened, the special jig is easily inserted into the gap between the body and the nut. However, problems with this method are that the operator should always carry such a special jig and separately use it at every fastening stage, causing inconvenience, and that a person other than an operator who conducted the fastening work cannot check the fastened state of the nut with a visual inspection.

Further, according to the conventional tube fitting, the hardness of the ferrule is increased over that of the tube so that the ferrule grips the outer surface of the tube in order to seal the tube fitting. However, problems with this configuration are that a variety of fitting conditions must be adhered to.

The fitting conditions required in the conventional tube fitting are as follows. First, the surface of a tube should have no damage such as scratches. This is because if the surface is slightly damaged, leakage may occur through the damaged portion under high pressure.

Second, a tube has a restricted harness. This condition results from the relationship with the ferrule, and the hardness of the ferrule should be greater than that of the tube. This is because the ferrule can be moved so that a leading end thereof is bent to grip the outer surface of the tube only when the hardness of the ferrule is greater than that of the tube and when the nut is fastened to the body. In order to increase the hardness of the ferrule, the ferrule is treated with heat treatment such as carburizing or nitrification. However, if the ferrule is carburized or nitrified, the hardness of the ferrule can be increased, but a problem also occurs in that corrosion resistance is reduced, being a cause of possible leakage.

Third, a tube should have the concentricity within the reference range. Fourth, the thickness of a tube should have a proper value that is not too thick, nor thin. If the thickness of the tube is not proper, a function of the ferrule is not completely formed, and is the cause of reduced airtightness. Fifth, in case of high pressure fitting, the thickness of a tube should be made greater than normal. However, if the thickness is increased, there is a problem of the airtightness being reduced when considering the relationship with the ferrule.

As previously described, the existing fitting structure should satisfy a variety of fitting conditions, so that the fitting is conducted complicatedly along with strict management, which is the cause of an increase in the cost.

For example, a fabricated tube may be carelessly scratched during transportation or treatment of fitting, but the scratched tube cannot be used.

DISCLOSURE

Technical Problem

Accordingly, the present invention has been made keeping in mind the above problems occurring in the related art, and an object of the present invention is to provide a technique of upon tube fitting, allowing an operator to easily check the degree of nut tightening to improve the assembly efficiency, and after the completion of assembly, allowing anyone to easily check the fastened state of a nut.

Another object of the present invention is to provide a new tube fitting which is suitable for high pressure while improving a tube fitting of the related art such that a variety of fitting conditions are minimized.

Technical Solution

In an aspect, the present invention provides a tightness-indicating tube fitting including a tube inserted into a body, at least one ferrule disposed around the tube, a nut fastened onto the body to deform the ferrule to provide a seal between the body and the tube, and a check ring designed, when the nut is fastened onto the body by the amount of nut rotation corresponding to a reference value, to be detached from the body by a pressing force of the nut such that the fastened state of the nut is checked.

In an exemplary embodiment, the check ring may have one or more breakable parts.

In an exemplary embodiment, the breakable parts may be collinearly disposed, each breakable part having the form of a notch.

In an exemplary embodiment, the check ring may be composed of two semi-circular parts that are coupled in a positive locking manner using protrusions and grooves.

In an exemplary embodiment, an indicating ring may be inserted into an inner surface of the check ring such that when the check ring is detached from the body, the indicating ring remains on the body.

In an exemplary embodiment, the check ring may have a pressure-receiving section protruding from a side of the check ring facing the nut, wherein an inner diameter part of the pressure-receiving section is provided with a slope.

In an exemplary embodiment, the tube may have, on the outer surface thereof, an anti-leakage groove into which, when the nut is fastened, the leading end of the ferrule is inserted while being deformed, forming a seal between the tube and the ferrule.

In an exemplary embodiment, the anti-leakage groove may have the shape of a wedge defined by a vertical surface and an inclined surface with a boundary therebetween rounded off such that when the ferrule is inserted into the anti-leakage groove, the ferrule is deformed and completely fills the anti-leakage groove, forming the airtight state.

In an exemplary embodiment, the ferrule may not be treated with heat treatment, and the outer surface of the tube may be provided in a state of being scratched.

In an exemplary embodiment, an indicating mark may be provided on an outer surface of the nut to check the precision of the sub-assembled state of the nut, and an inner diameter of the check ring may be larger than an outer surface of a front end of the nut such that when the nut is sub-assembled to the body, an end of the check ring coincides with the indicating mark so that the precision of the sub-assembled state of the nut is possibly checked.

In an exemplary embodiment, the check ring may be composed of two separate semi-circular parts, which are disposed opposite each other, forming a circular ring, and an adhesive tape attached onto the outer surface of the circular ring to hold the semi-circular parts together such that when the pressing force of the nut is exerted, the adhesive tape is torn apart so that the semi-circular parts are separated.

In an exemplary embodiment, the indicating ring may have, on inner and outer surfaces thereof, first and second engaging protrusions, respectively, which engage with the body and the check ring, respectively.

In another aspect, the present invention provides a tightness-indicating tube fitting including a tube inserted into a body, at least one ferrule disposed around the tube, a nut fastened onto the body to deform the ferrule to provide a seal between the body and the tube, and a check ring designed to check the amount of nut tightening, and having a step-like inner diameter portion consisting of a relatively-large diameter part and a relatively-small diameter part with a boundary step formed therebetween, wherein the check ring is inserted into the nut such that the relatively-large diameter part surrounds the outer surface of the front portion of the nut, and wherein when the nut is fastened by an amount of nut rotation that corresponds to a reference value, an end portion of the relatively-small diameter part of the check ring comes into contact with and moves up along an inclined surface of the body, so that the check ring is separated and detached from the nut.

Advantageous Effects

According to the present invention, when a nut is fastened, an operator can check the degree of nut tightening without using a separate jig, so that the assembly efficiency can be improved, and anyone can implement the assembly. Further, even after the assembly is completed, an indicating ring remains on a body so that anyone can check whether the assembly has been precisely performed.

According to the present invention, even when a tube has been scratched, the tube can be used as a fitting tube, heat treatment is not advantageously required to a ferrule, and the assembly is performed without being impeded by a variety of fitting conditions, thereby improving assembly efficiency and reducing the cost.

BEST MODE

Now a tightness-indicating tube fitting according to the present invention will be described in detail with reference to the accompanying drawings, which are used to help a person understand the technical spirit of the present invention. However, since the drawings illustrated merely depict exemplary embodiments of the present invention, it should be noted that simple modifications performed by other persons will be covered by the scope of the present invention.

The tube fitting generally includes a body, a tube, at least one ferrule, and a nut. The number of the ferrules may be one or two or more. In addition to these elementary components, the tube fitting also includes a check ring which enables a person to check the amount of nut torque at which a nut is fastened.

Figure 1:
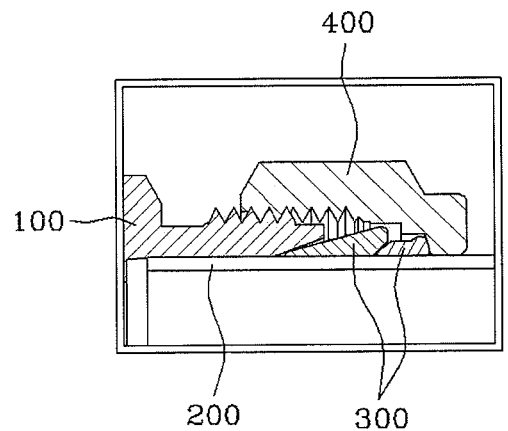
FIGS. 1 and 2 are schematic views of a tube fitting structure of the related art.
Figure 2:
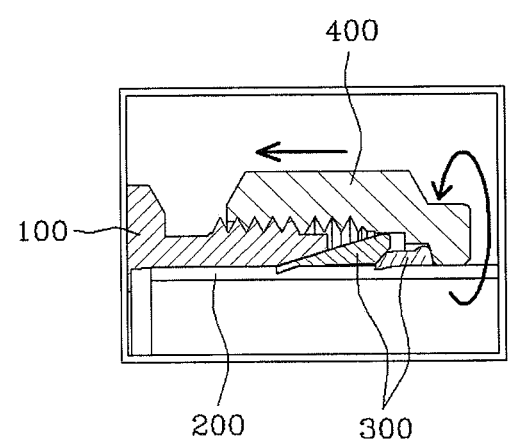
Figure 3:
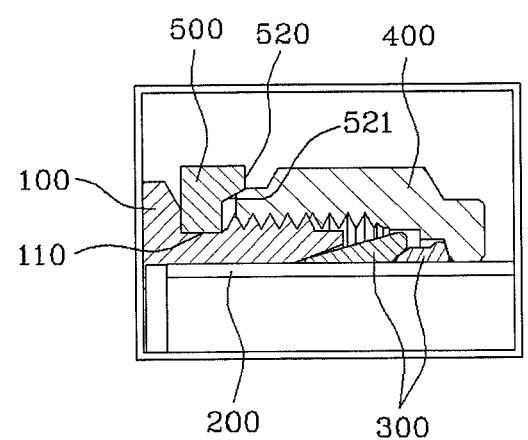
FIGS. 3 and 4 are schematic partial cross-sectional views of a tube fitting according to a first embodiment.
Figure 4:
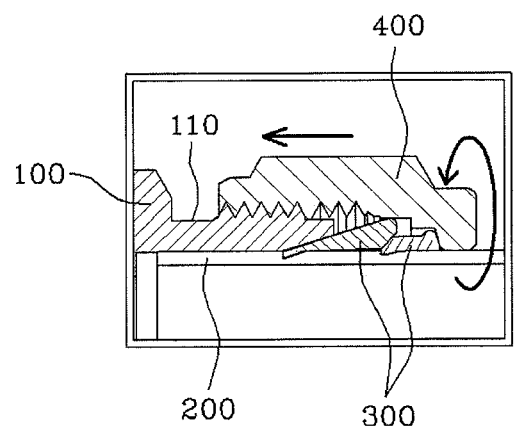
Figure 5:
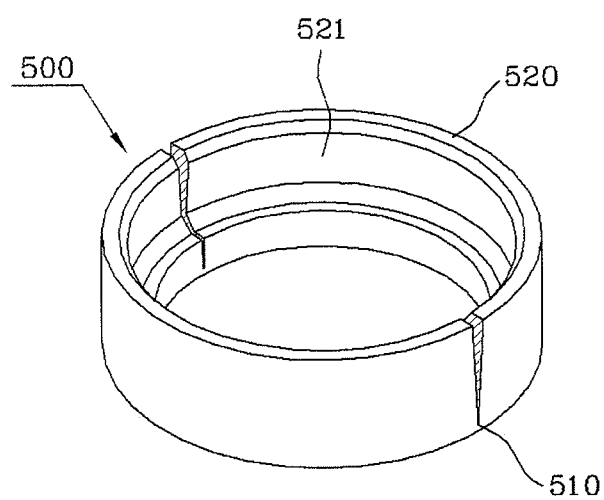
FIGS. 5 to 7 are perspective views of a check ring.
Figure 6:
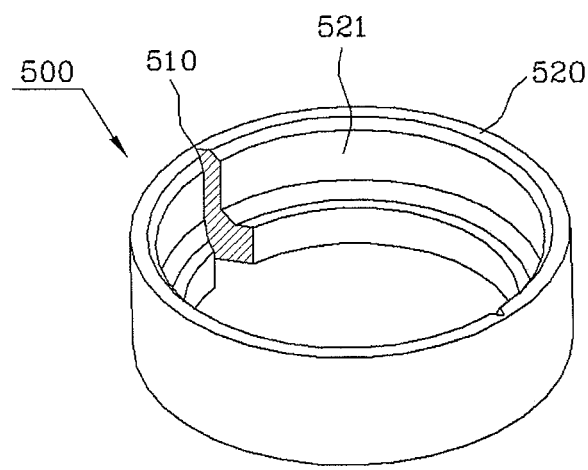
Figure 7:
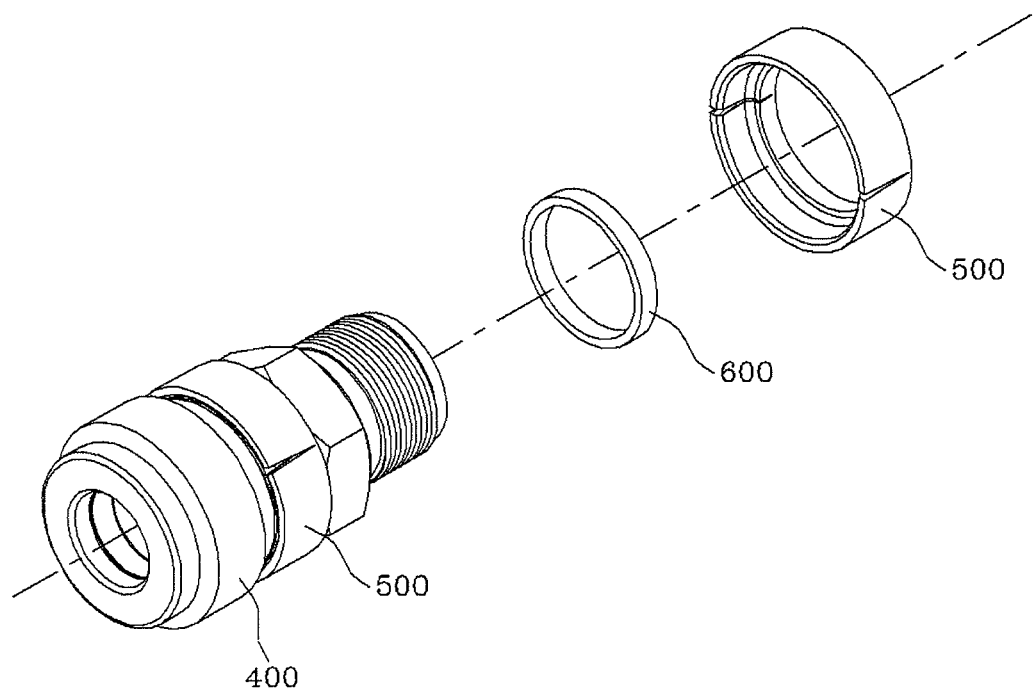

A first embodiment of the present invention will now be described with reference to FIGS. 3 to 7, wherein FIGS. 3 and 4 are schematic partial cross-sectional views of a tube fitting according to a first embodiment, and FIGS. 5 to 7 are perspective views of a check ring.

As shown in the figures, the tube fitting is configured such that a check ring 500 is mounted around a plain portion 110 of a body 100 in such a manner that the check ring 500 is detached from the body 100 by a pressing force of the nut 400 only when a nut 400 is turned and fastened to the body 100 by the amount of nut rotation corresponding to predetermined turns of the nut as the nut moves forwards, so that the fastened state of the nut 400 can be easily checked.

In the first embodiment, the check ring 500 is provided with one or more breakable parts 510, which is relatively weak, and at which the check ring 500 is broken and then detached from the body 100.

In the present embodiment, two breakable parts 510 are diametrically collinearly disposed in a recessed form in the circumference of the check ring, so that when a pressing force of the nut 400 is exerted, the check ring cracks apart at the breakable parts 510 and then is split into two parts.

The breakable part 510 may have a variety of shapes such as a wedge or the like, which have a structure that is weaker than other parts so that it can be broken by the pressing force of the nut 400.

Specifically, as shown in the figure, the check ring 500, which is compressed by the contact of the nut 400, has a pressure-receiving section 520 that protrudes from the nut-side edge, and an inner diameter part of the pressure-receiving section 520 is preferably formed to have a slope 521. Thus, as the nut 400 moves forwards after having made initial contact with the pressure-receiving section 520, the pressing force acts outwards when the nut moves forward along the slope 521, so that the check ring 500 opens and is broken at the breakable parts 510.

Figure 8:
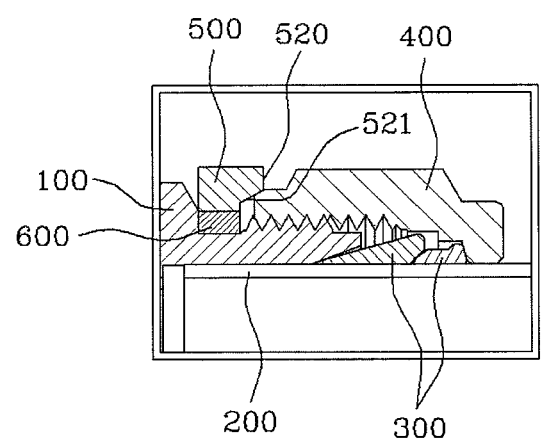
FIGS. 8 and 9 are schematic partial cross-sectional views of a tube fitting according to a second embodiment.
Figure 9:
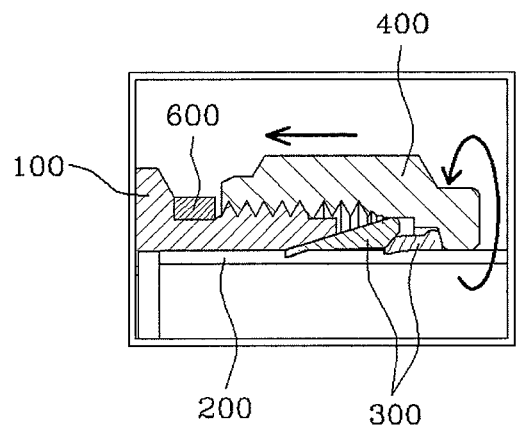
Figure 10:
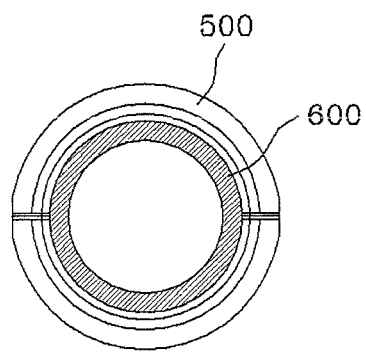
FIGS. 10 to 12 are views showing an assembly of a check ring and an indicating ring in elevation and cross-section.
Figure 11:
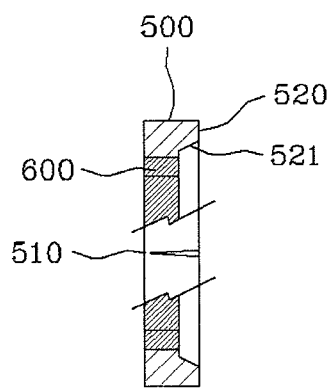
Figure 12:
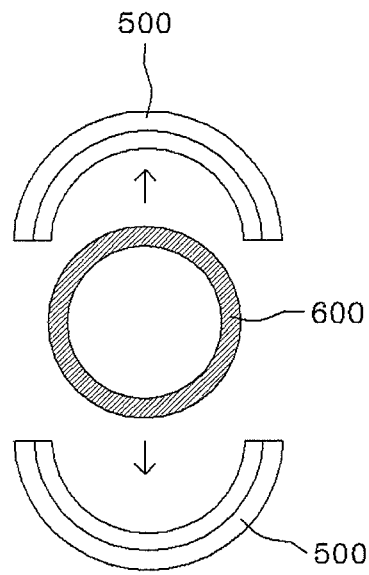
Figure 13:
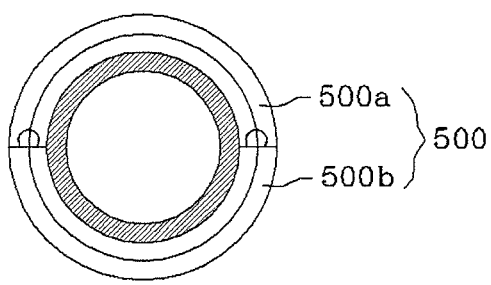
FIGS. 13 to 17 are schematic views showing a tube fitting according to a third embodiment in elevation and cross-section.
Figure 14:
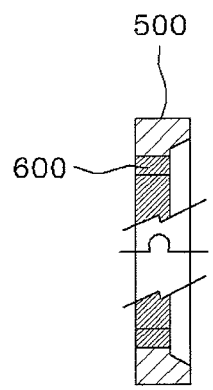
Figure 15:
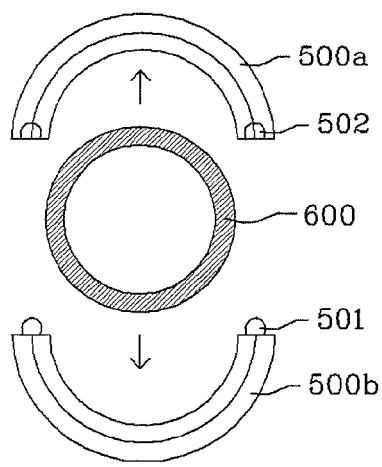
Figure 16:
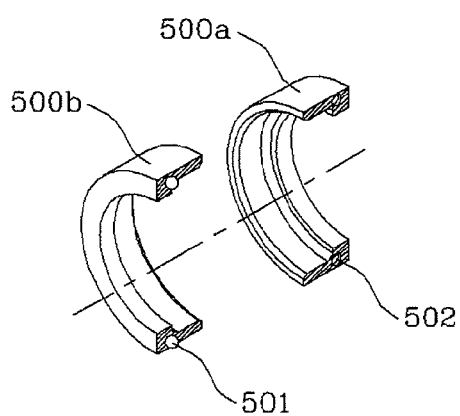
Figure 17:
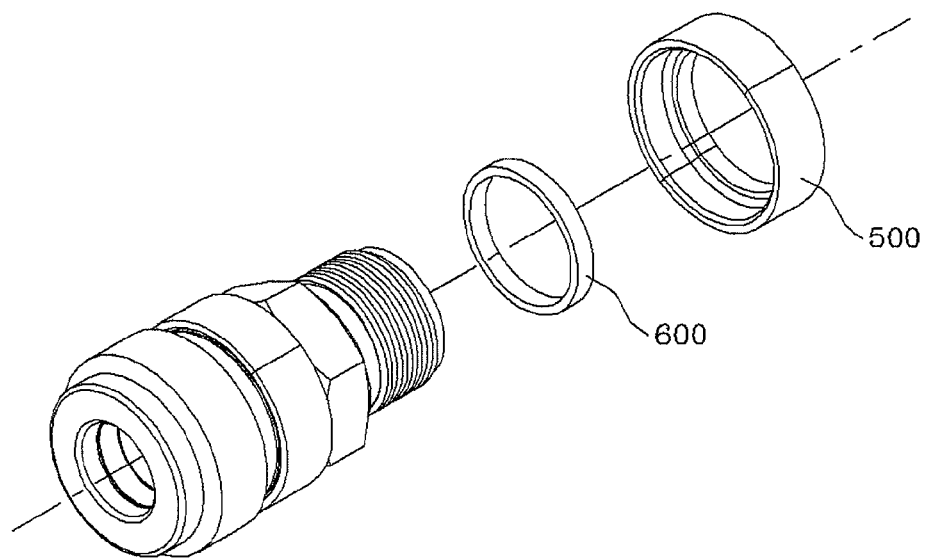

A second embodiment of the present invention will now be described with reference to FIGS. 8 to 12, wherein FIGS. 8 and 9 are schematic partial cross-sectional views of a tube fitting according to the second embodiment, and FIGS. 10 to 12 are views showing an assembly of a check ring and an indicating ring in elevation and section.

In the present embodiment, the tube fitting is characterized in that an indicating ring 600 is additionally mounted around an inner surface of the check ring 500. In the state of the indicating ring 600 and the check ring 500 being fitted around the outer surface of the body 100, when the check ring 500 is detached from the body 100 by the fastening force of the nut 400, the indicating ring 600 still remains on the body 100, so that one can check by visual inspection that the nut has been fastened with precision. The indicating ring 600 is arranged in such a manner as to strike a person's sight preferably by reducing a horizontal movement that may occur by friction with the check ring 500, or otherwise by being colored.

Mounting the indicating ring 600 around the inner surface of the check ring 500 enables anyone to easily check the existence of the indicating ring 600 even after the assembly has been completed. Further, since the indicating ring may be colored in a variety of types of colors, the indicating ring can also be used to display a factor such as the importance of a certain fitting element using the displayed colors.

A third embodiment of the present invention will now be described with reference to FIGS. 13 to 17 which are schematic views showing a tube fitting according to the third embodiment in elevation and cross-section.

In the third embodiment, a check ring 500 is mounted around the outer surface of the body 100 in a built-up manner. As shown in the figure, the check ring 500 consists of two semi-circular parts 500a and 500b, which are coupled each other to form the check ring 500. The two semi-circular parts 500a and 500b are provided at respective coupling ends with protrusions 501 and grooves 502, which are coupled each other in a positive-locking manner. The coupling between the two semi-circular parts 500a and 500b using the protrusions 501 and the grooves 502 is not a permanent coupling, so that when the pressing force of the nut 400 acts on the check ring 500, which was formed by coupling the two semi-circular parts 500a and 500b, as the nut 400 is fastened to and advanced along the body 100, the two semi-circular parts are separated from each other and are detached from the body 100.

That is, if the nut 400 is properly fastened, the check ring 500 is detached from the body 100, so that one can easily check whether the nut 400 has been properly fastened or not.

Here, the semi-circular parts 500a and 500b are not limited to those illustrated in the figure, but may also include a change such as a continuous irregular pattern being fox ined on an inner or outer surface.

In the third embodiment, an indicating ring 600 may also be disposed around an inner diameter surface of the check ring 500 in order to check by visual inspection whether the fitting assembly has been completed or not.

Figure 18:
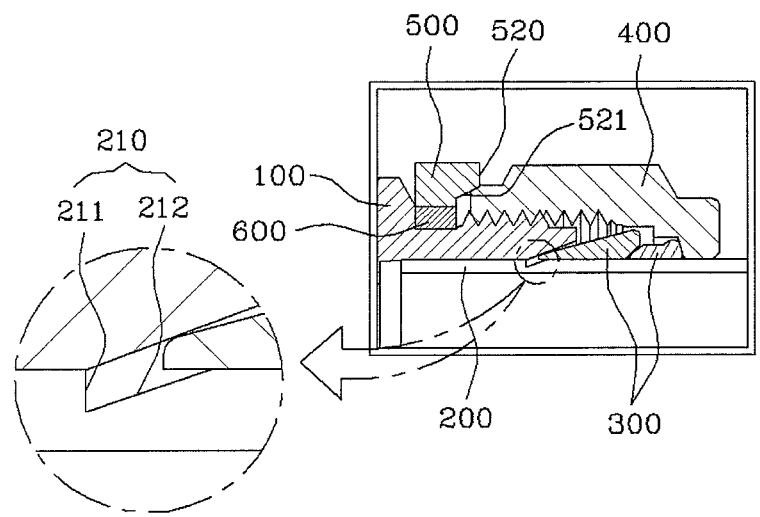
FIGS. 18 and 19 are schematic partial cross-sectional views of a tube fitting according to a fourth embodiment.
Figure 19:
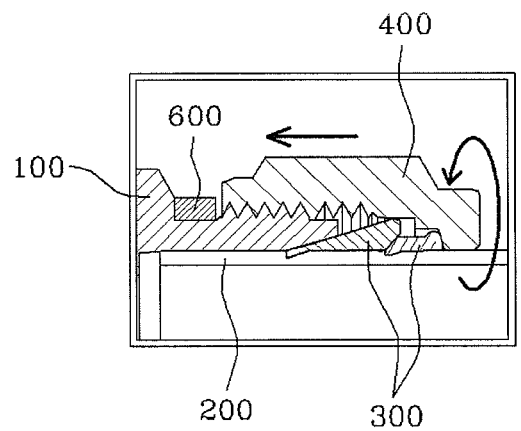

A fourth embodiment of the present invention will now be described with reference to FIGS. 18 and 19 which are schematic partial cross-sectional views of a tube fitting according to the fourth embodiment.

In the fourth embodiment, the structure of the tube fitting is such that like the above-mentioned embodiments, a check ring 500 and an indicating ring 600, if needed, are generally provided in order to check the amount of nut torque, and is characterized in that an anti-leakage groove 210 is additionally formed in the outer surface of the tube 200. The number of anti-leakage grooves 210 is the same number as the number of ferrules 300 that are used.

Because of the anti-leakage groove 210 being formed in the outer surface of the tube 200, when the nut 400 is fastened, the leading end of the ferrule 300 is inserted into and fills the anti-leakage groove 210 while being deformed, forming a seal between the tube and the ferrule.

The anti-leakage groove 210 has a variety of shapes such as a wedge according to the present embodiment. Here, the anti-leakage groove 210 is defined by a vertical surface 211 and an inclined surface 212 with a boundary therebetween rounded off such that when the ferrule is inserted into the anti-leakage groove, the ferrule is deformed and completely fills the anti-leakage groove.

When the anti-leakage groove 210 has been previously formed in the outer surface of the tube 200 as in the present embodiment, even though the outer surface of the tube 200 has been damaged for example scratched, it does not affect the fitting assembly.

Further, while heat treatment is generally conducted on the ferrule in order to keep the hardness of the ferrule higher than that of the tube, the provision of the anti-leakage groove 210 advantageously makes it possible to remove such heat treatment on the ferrule 300 from the process of fitting assembly.

According to the tube fitting structure of the embodiment, the amount of nut 400 torque can be easily checked by the detachment of the check ring 500 or the exposure of the indicating ring 600, and a hermetic seal is concurrently formed between the tube and the ferrule by the ferrule 300 being inserted into the anti-leakage groove 210, thereby providing excellent advantages when compared to the tube fitting technique of the related art.

Further, when two or more ferrules 300 are used, one or two anti-leakage grooves may be formed. Here, any one ferrule is used and fitted into the anti-leakage groove, and the other ferrules are used to grip the outer surface of the tube, forming a seal.

Figure 20:
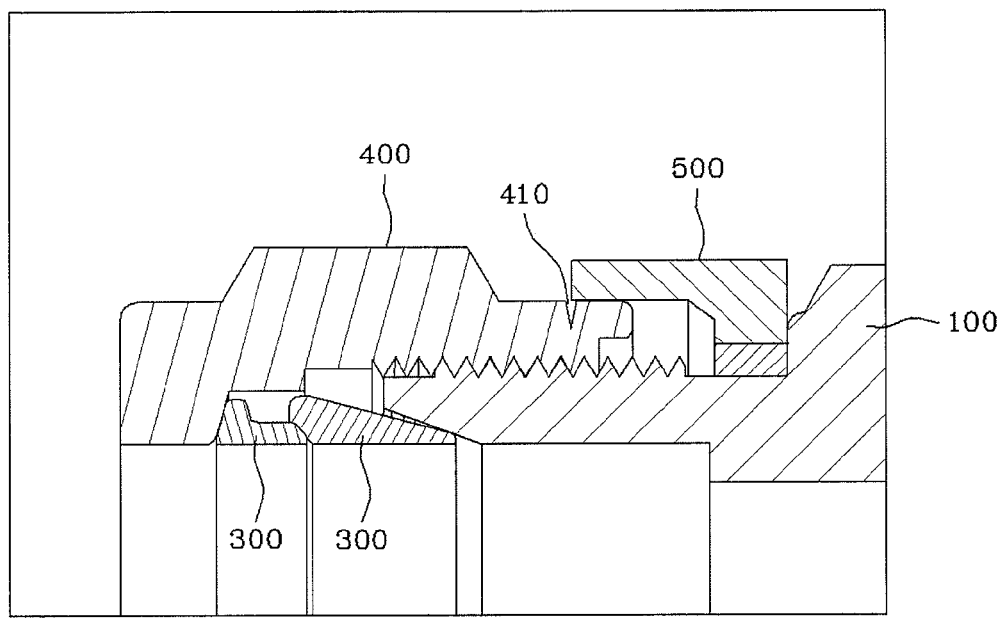
FIG. 20 is a schematic partial cross-sectional view of a tube fitting according to a fifth embodiment.
Figure 21:
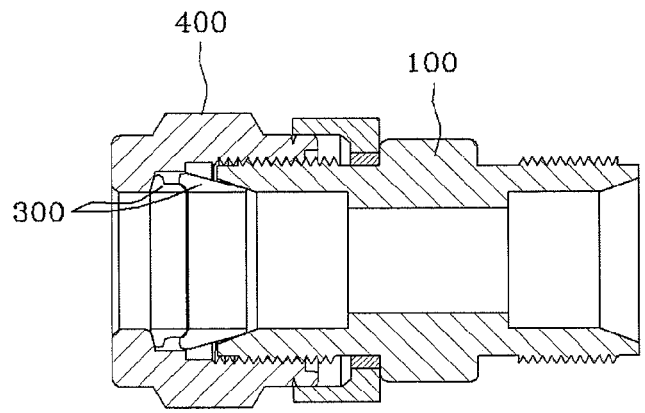
FIGS. 21 to 23 are views showing an example of practical use of the tube fitting of the fifth embodiment.
Figure 22:
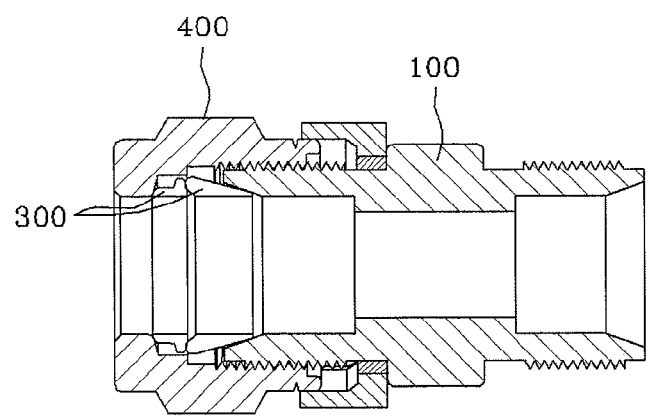
Figure 23:
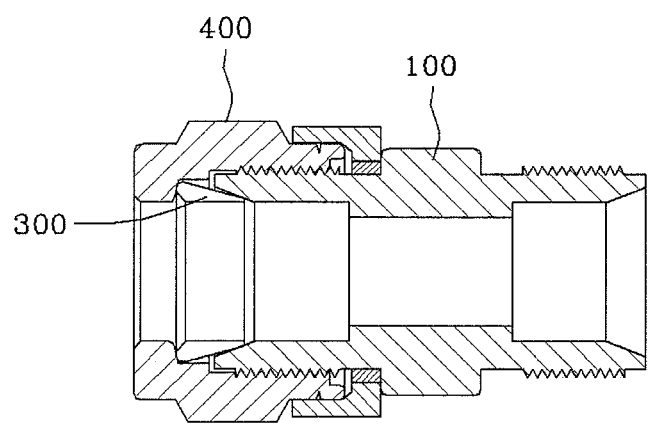

A fifth embodiment of the present invention will now be described with reference to FIGS. 20 to 23, wherein FIG. 20 is a schematic partial cross-sectional view of a tube fitting according to the fifth embodiment, and FIGS. 21 to 23 are views showing an example of practical use of the tube fitting of the fifth embodiment.

As shown in the figures, the tube fitting of the fifth embodiment has an additional function of checking the precision of the sub-assembled state in order to make the tube fitting assembly more convenient and reliable.

Here, the term 'sub-assembled state' means the state of preparing the fitting assembly by providing elements for the fitting assembly and incompletely fastening the nut. That is, a required number of ferrules 300 and a nut 400 are fitted around a tube, the tube fitted with former elements is inserted into a body 100, and the nut 400 is manually screwed and fastened to the body 100. Here, merely manually fastening the nut cannot cause the ferrule 300 to be deformed. Then, the fastening of the nut 400 accompanied by the deformation of the ferrule 300 is accomplished by using a tool. The 'sub-assembled state' means the assembly state before using the tool. When the nut is rotated to the extent that the amount of nut rotation reaches a reference value (e.g. one and quarter turns) in the sub-assembled state, the desired tube fitting is completed.

However, if the sub-assembled state is not proper, a complete seal cannot be formed even though the nut has been fastened. In case of using two ferrules 300, if one ferrule 300 is omitted (See FIG. 23) or inserted in a different direction (See FIG. 22), errors in the assembly must be visually inspected even in the sub-assembled state.

To satisfy the need for this visual inspection, the essential configuration may be one in which the check ring 500 is mounted to the body 100, and an indicating mark 410 is formed on the outer surface of the front portion of the nut 400. The indicating mark 410 is a mark like a notch which is formed in the surface of the nut. When sub-assembly is correctly performed, an end of the check ring 500 coincides with the indicating mark 410.

The check ring 500 may be of the same type as in any one of the above-mentioned embodiments so that when the tube fitting is completed, the check ring is detached from the body 100 by a pressing force of the nut 400. Particularly in the present embodiment, the check ring 500 is configured such that the inner diameter of the check ring 500 is greater than the outer diameter of the front portion of the nut 400 such that the nut-side part of the check ring 500 surrounds the outer surface of the front portion of the nut 400. Here, as the sub-assembly is performed, the end of the check ring 500 coincides with the indicating mark 410 formed on the nut 400. Here, if the nut is further fastened by the number of rotation corresponding to a reference value under the sub-assembled state, the nut is advanced forward to detach the check ring from the body.

According to the fifth embodiment as described above, it is possible to not only check how far the nut has been fastened, but also easily check the precision of the sub-assembled state before the fitting assembly is performed, so that errors in assembly can be reduced.

Figure 24:
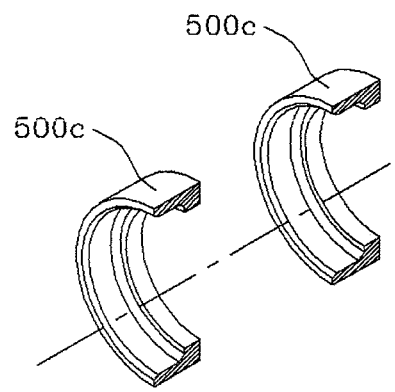
FIGS. 24 and 25 are perspective views of a tube fitting according to a sixth embodiment.
Figure 25:
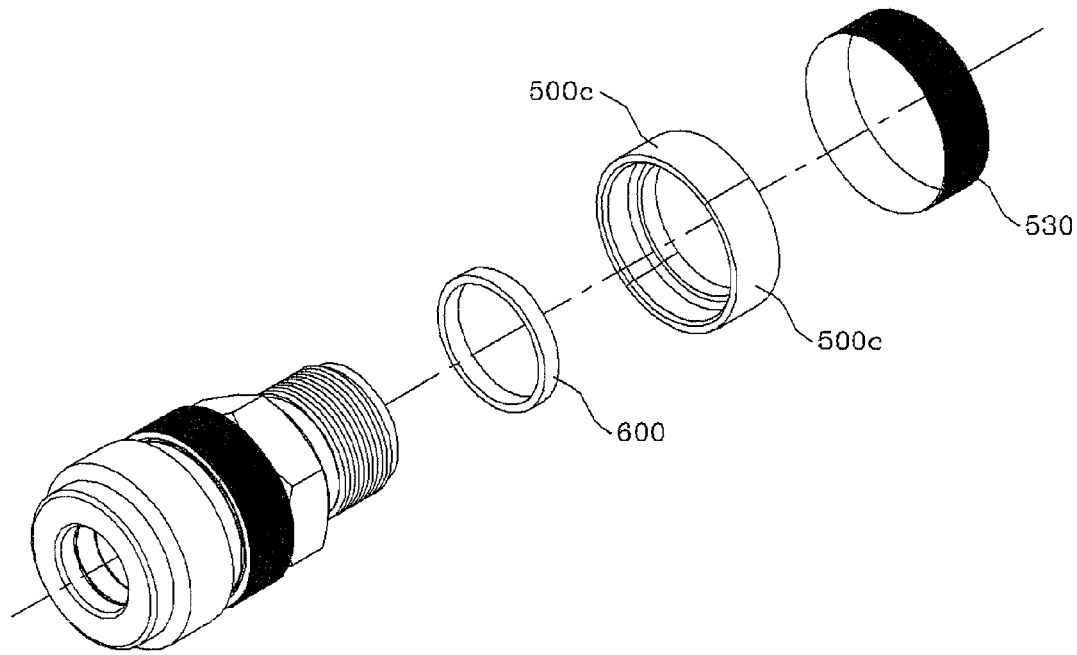

A sixth embodiment of the present invention will now be described with reference to FIGS. 24 and 25 which are perspective views of a tube fitting according to the sixth embodiment.

The tube fitting of the sixth embodiment is configured such that a check ring 500 consists of two separate semi-circular parts 500c which are disposed opposite each other, forming a circular ring, and adhesive tape 530 is attached onto the outer surface of the circular ring to hold the semi-circular parts together.

The two semi-circular parts 500c are separate parts that are coupled together to form a circle using the tape 530, which is made from paper tape, aluminum foil tape or the like which can be easily torn apart by an external force. When the nut 400 is advanced to force the check ring 500 in the state of the check ring 500 being mounted to the body 100, a force is generated at boundaries between the two semi-circular parts 500c towards the outside, so that the tape 530 can be torn apart and split off. Of course, an indicating ring 600 may be further disposed around the inner diameter surface of the check ring 500.

Figure 26:
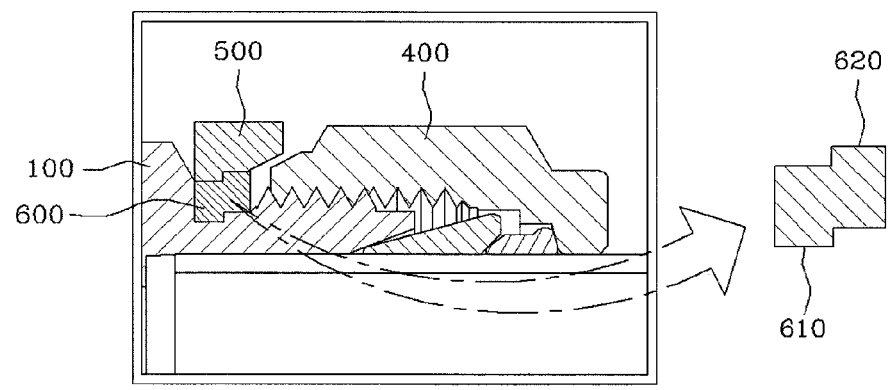
FIGS. 26 to 28 are schematic partial cross-sectional views of a tube fitting according to a seventh embodiment.
Figure 27:
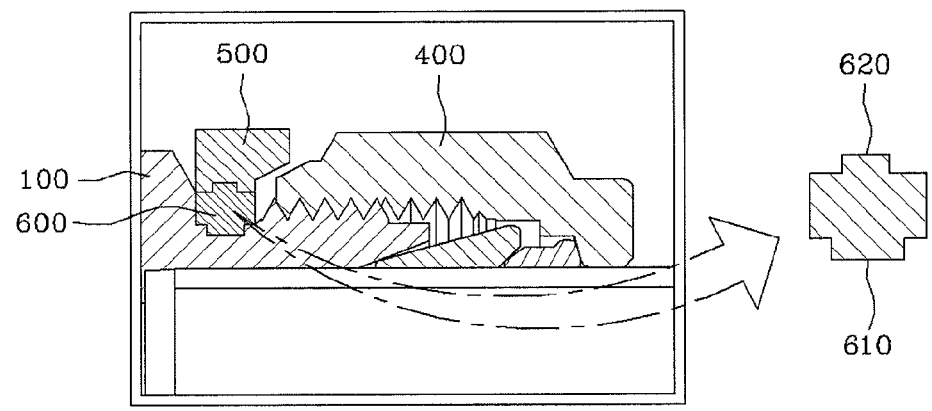
Figure 28:
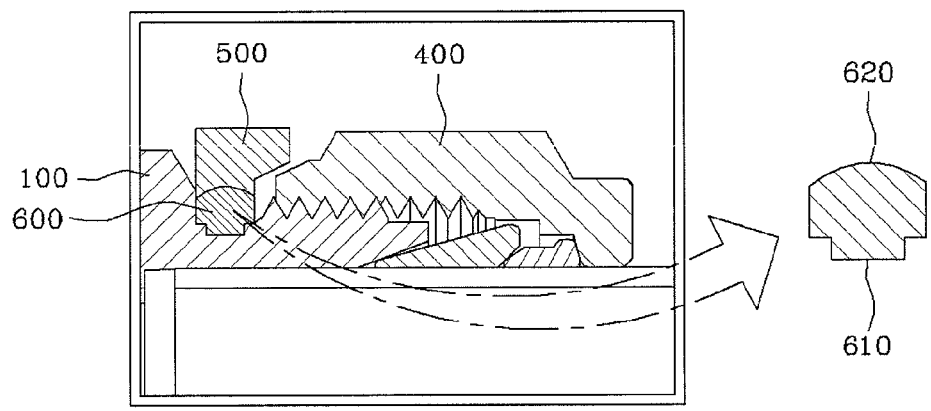

A seventh embodiment of the present invention will now be described with reference to FIGS. 26 to 28 which are schematic partial cross-sectional views of a tube fitting according to the seventh embodiment.

According to the present embodiment as shown in the figure, the structure is such that a check ring 500 is mounted to a body 100 and an indicating ring 600 is mounted around an inner diameter surface of the check ring 500, in order to check the amount of nut tightening when the tube fitting is performed.

The embodiment makes a proposal to prevent the indicating ring 600 and the check ring 500, which are mounted to the body 100, from being moved. The proposal is such that the indicating ring 600 has, on inner and outer surfaces thereof, first and second engaging protrusions 610 and 620, respectively, which engage with the body 100 and the check ring 500, respectively. In conformity with this configuration, the body 100 has, on outer surface thereof, a recess corresponding to the first engaging protrusion 610 and the check ring 500 has, on inner surface thereof, a recess corresponding to the second engaging protrusion 620. The first and second engaging protrusions 610 and 620 may have a variety of shapes as shown in the figure.

According to the construction of the embodiment, the indicating ring or the check ring can be held in position and not be moved easily even by shocks or external force, enabling the amount of nut tightening to be precisely measured.

Figure 29:
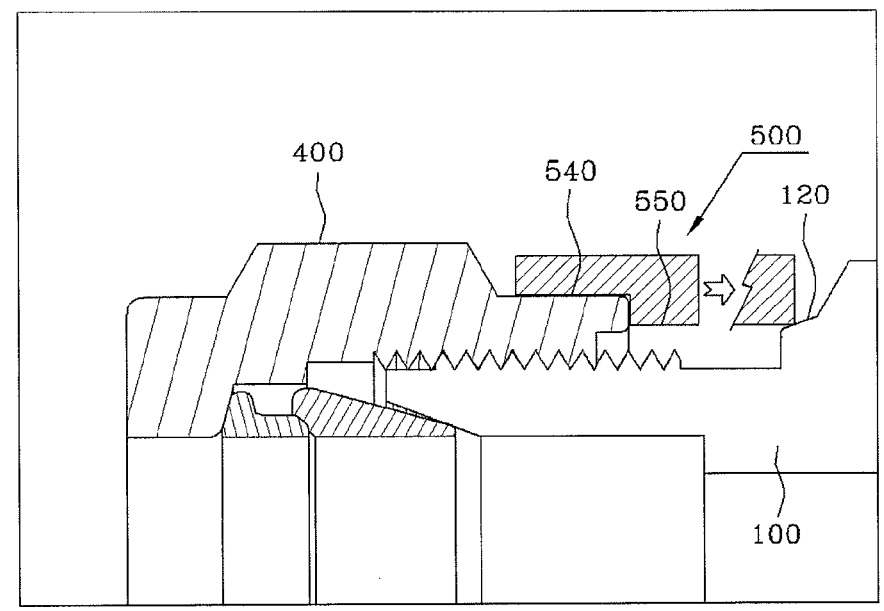
FIG. 29 is a schematic partial cross-sectional view of a tube fitting according to an eighth embodiment.

An eighth embodiment of the present invention will now be described with reference to FIG. 29 which is a schematic partial cross-sectional view of a tube fitting according to the eighth embodiment.

The tube fitting of the eighth embodiment includes a check ring 500 which is detached when a nut is fastened as in the former embodiments. However, the tube fitting is configured in a different manner such that the check ring 500 is coupled not to a body 100, but to a nut 400 so that after the fitting assembly is completed, the check ring is detached from the nut 400.

In the embodiment, the check ring 500 has the shape having an outer diameter portion and a step-like inner diameter portion that consists of a relatively-large diameter part 540 and a relatively-small diameter part 550 with a boundary step formed therebetween. Here, the check ring 500 is inserted into the nut 400 such that the relatively-large diameter part 540 surrounds the outer surface of the front portion of the nut 400, until the boundary step between the relatively-large diameter part 540 and the relatively-small diameter part 550 comes into contact with the end portion of the nut 400.

When the nut 400 is fastened by the amount of nut rotation corresponding to a reference value in the state of the nut 400 being inserted into the check ring 500, an end portion of the relatively-small diameter part 550 of the check ring 500 comes into contact with and moves up along an inclined surface 120 of the body 100, so that the check ring is separated and detached from the nut 400. The structure of the check ring of the embodiment is one that is detachable by an external force, so that it may be of the same type as in one of the former embodiments. The inclined surface 120 of the body 100 serves as a connection medium with which the end portion of the relatively-small diameter part 550 of the check ring 500, which is fitted into the nut 400, comes into contact to cause the check ring 500 to widen and be separated as the pressing force of the nut 400 increases.

As described before, according to the embodiments of the present invention, it is possible to perform the tube fitting assembly in a simpler, faster manner and to reduce assembly errors, and the like.

INDUSTRIAL APPLICABILITY

According to the tube fitting of the present invention, anyone can easily check the amount of nut tightening so that the assembly efficiency can be improved, and if an indicating ring is used together with a check ring, anyone can also check whether the fitting assembly has been performed or not even after the fitting assembly has been completed, and since there is no need for a separate jig to check the amount of nut tightening when compared to the related art, the tube fitting is highly applicable to diverse fields of industries.

Further, the tube fitting structure of the present invention has improved sealing performance relative to the related art, and does not require a variety of fitting conditions, so that cost reduction in many areas and assembly efficiency can be obtained, thereby improving the applicability to many fields of industries from low pressure fitting to high pressure fitting.

The invention claimed is:

1. A tightness-indicating tube fitting comprising:
   a tube inserted into a body;
   at least one ferrule disposed around the tube;
   a nut fastened onto the body to deform the ferrule for providing a seal between the body and the tube; and
   a check ring having a pressure-receiving section protruding from a side of the check ring facing the nut, the pressure-receiving section having an inner diameter part which is provided with a slope,
   wherein, when the nut is fastened onto the body by an amount of nut rotation corresponding to a predetermined length, and as the nut moves forward after having made contact with the slope of the pressure-receiving section, a pressing force from the nut acts on the slope of the check ring to detached by breaking the check ring from the body by the pressing force of the nut such that a fastened state of the nut is checked.

2. The tightness-indicating tube fitting according to claim 1, wherein the check ring has one or more breakable parts.

3. The tightness-indicating tube fitting according to claim 2, wherein the breakable parts are collinearly disposed, each breakable part having the form of a notch.

4. The tightness-indicating tube fitting according to claim 3, wherein an indicating ring is inserted into an inner surface of the check ring such that when the check ring is detached from the body, the indicating ring remains on the body.

5. The tightness-indicating tube fitting according to claim 3, wherein the tube has, on an outer surface thereof, an anti-leakage groove into which, when the nut is fastened, the leading end of the ferrule is inserted while being deformed, forming a seal between the tube and the ferrule.

6. The tightness-indicating tube fitting according to claim 2, wherein an indicating ring is inserted into an inner surface of the check ring such that when the check ring is detached from the body, the indicating ring remains on the body.

7. The tightness-indicating tube fitting according to claim 2, wherein the tube has, on an outer surface thereof, an anti-leakage groove into which, when the nut is fastened, the leading end of the ferrule is inserted while being deformed, forming a seal between the tube and the ferrule.

8. The tightness-indicating tube fitting according to claim 1, wherein the check ring is composed of two semi-circular parts that are coupled in a positive locking manner using protrusions and grooves.

9. The tightness-indicating tube fitting according to claim 8, wherein an indicating ring is inserted into an inner surface of the check ring such that when the check ring is detached from the body, the indicating ring remains on the body.

10. The tightness-indicating tube fitting according to claim 8, wherein the tube has, on an outer surface thereof, an anti-leakage groove into which, when the nut is fastened, the leading end of the ferrule is inserted while being deformed, forming a seal between the tube and the ferrule.

11. The tightness-indicating tube fitting according to claim 1, wherein an indicating ring is inserted into an inner surface of the check ring such that when the check ring is detached from the body, the indicating ring remains on the body.

12. The tightness-indicating tube fitting according to claim 11, wherein an indicating mark is provided on an outer surface of the nut to check the precision of a sub-assembled state of the nut, and an inner diameter of the check ring is larger than an outer surface of a front end of the nut such that when the nut is sub-assembled to the body, an end of the check ring coincides with the indicating mark so that the precision of the sub-assembled state of the nut is possibly checked.

13. The tightness-indicating tube fitting according to claim 11, wherein the indicating ring has, on inner and outer surfaces thereof, first and second engaging protrusions, respectively, which engage with the body and the check ring, respectively.

14. The tightness-indicating tube fitting according to claim 1, wherein the tube has, on an outer surface thereof, an anti-leakage groove into which, when the nut is fastened, the leading end of the ferrule is inserted while being deformed, forming a seal between the tube and the ferrule.

15. The tightness-indicating tube fitting according to claim 14, wherein the anti-leakage groove has the shape of a wedge defined by a vertical surface and an inclined surface with a boundary therebetween rounded off such that when the ferrule is inserted into the anti-leakage groove, the ferrule is deformed and completely fills the anti-leakage groove, forming the airtight state.

16. The tightness-indicating tube fitting according to claim 14, wherein the ferrule is not treated with heat treatment, and the outer surface of the tube is provided in a state of being scratched.

17. The tightness-indicating tube fitting according to claim 1, wherein the check ring is composed of two separate semi-circular parts, which are disposed opposite each other, forming a circular ring, and an adhesive tape attached onto the outer surface of the circular ring to hold the semi-circular parts together such that when a pressing force of the nut is exerted, the adhesive tape tears apart so that the semi-circular parts are separated.

* * * * *